Dec. 24, 1957  G. A. BRETTELL, JR  2,817,801
PLOTTING ELECTRIC SERVO SYSTEM
Original Filed Jan. 16, 1946  2 Sheets-Sheet 1

INVENTOR.
GEORGE A. BRETTELL, JR.
ATTORNEYS

Dec. 24, 1957   G. A. BRETTELL, JR   2,817,801
PLOTTING ELECTRIC SERVO SYSTEM
Original Filed Jan. 16, 1946   2 Sheets-Sheet 2

INVENTOR.
GEORGE A. BRETTELL, JR.
ATTORNEYS

United States Patent Office 2,817,801
Patented Dec. 24, 1957

2,817,801

PLOTTING ELECTRIC SERVO SYSTEM

George A. Brettell, Jr., Newark, N. J., assignor to the United States of America as represented by the Secretary of the Navy Original application January 16, 1946, Serial No. 641,607. Divided and this application January 29, 1954, Serial No. 407,621

6 Claims. (Cl. 318—28)

This invention relates generally to electrical servo systems and more particularly to a new and improved servomotor drive system having novel filter means for contributing to the high speed of operation of the servo system.

This is a divisional application of an application of George A. Brettell, Jr., Serial No. 641,607, filed January 16, 1946, now Patent No. 2,692,377.

The present invention is concerned with a servo system including a motor having an output shaft which is to be driven to a selected angular position with a minimum of oscillation. The difference between the selected angular shaft position and the instantaneous angular position of the shaft is converted to an error signal. A filter circuit is provided for converting the error signal to a motor drive control signal which varies as the algebraic sum of a first signal voltage component in phase with the error signal and of magnitude proportional to the instantaneous magnitude of the error signal and a second signal voltage component in phase with the error signal and of magnitude proportional to the rate of change of the error signal. The motor drive signal, in effect, is a frequency carrier, a 60 cycle voltage, which has an instantaneous amplitude directly proportional to the instantaneous motor shaft position relative to a selected position and an envelope frequency proportional to the rate of change of shaft position.

The filter circuit is in the form of a bridge circuit including a pair of resistive arms and a pair of reactive arms. Each of the reactive arms includes a parallel combination of inductance and capacitance resonant at the frequency of the carrier signal.

The criteria which govern operation of this filter are two in number. The first criterion, for obtaining transmission at 60 cycles, is that the capacitance and inductance of each of the reactive arms of the bridge are so chosen that they are resonant at the 60 cycle carrier frequency and, at such resonant frequency, have a resistance which is greater than the resistance of the resistive arms. The second criterion, which governs the obtaining of an optimum or maximum rate component from the filter, depends on the choice of the Q of the coil providing the inductance of each of the reactive arms of the bridge. To this end, the inductance of the coil preferably has a ratio of shunt resistance to reactance at the error signal frequency which is less than one-half of the ratio of the error signal frequency to the frequency of the maximum rate of change of amplitude of the error sginal whereby the second or rate component of the motor drive control signal approaches maximum magnitude at the maximum rate of change of amplitude of the error signal.

An object of the present invention is to provide a new and improved electric servo system for driving a servomotor with high speed and a minimum of oscillation.

Another object is to provide a new and improved filter circuit for converting a motor error signal to a motor drive control signal which varies as the algebraic sum of first and second signal components proportional respectively to the instantaneous amplitude and rate of change of amplitude of the error signal.

Other objects and many of the attendant advantages of this invention will be readily appreciated as the same becomes better understood by reference to the following detailed description when considered in connection with the accompanying drawings wherein.

Figure 1:
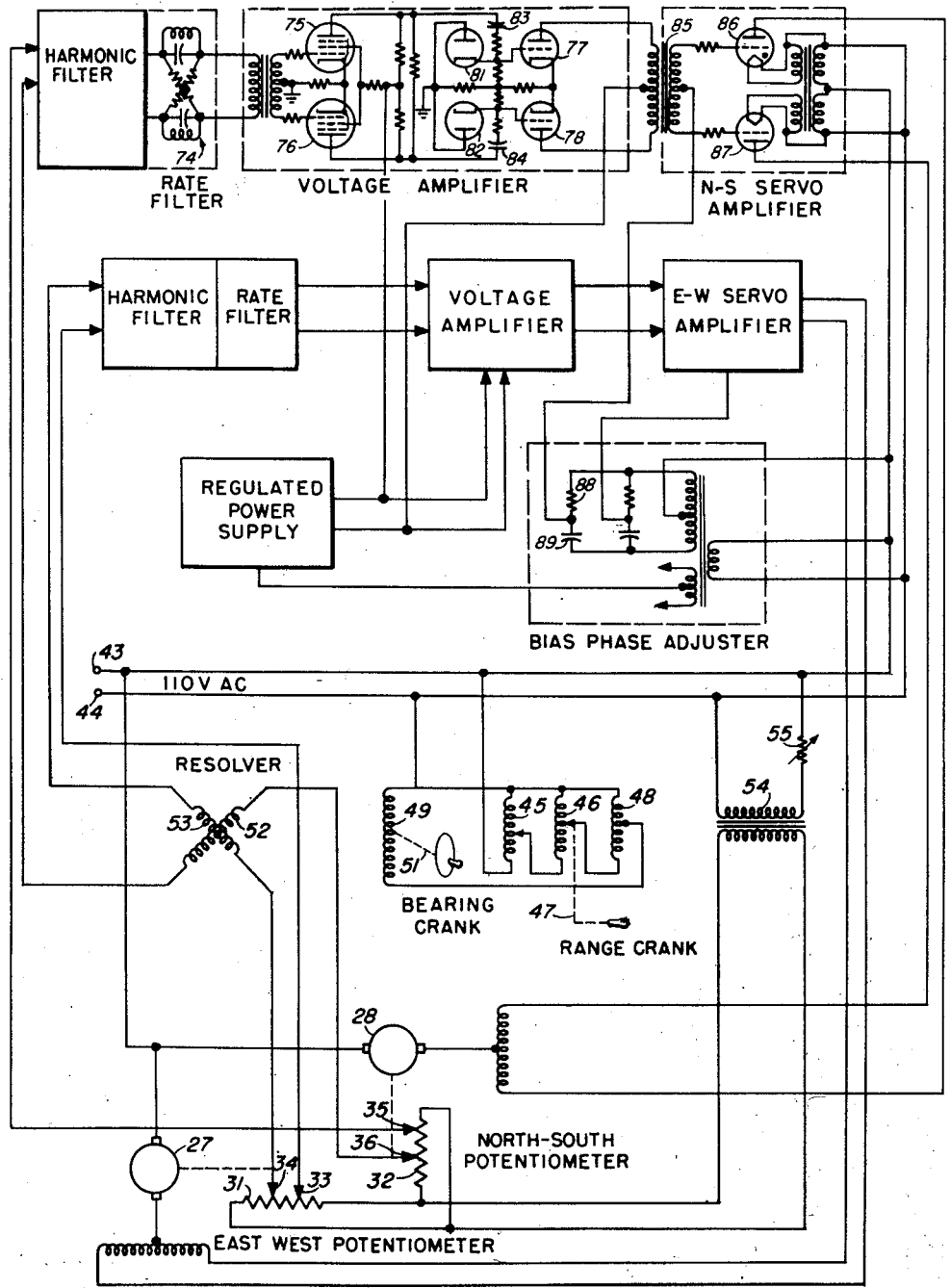
Fig. 1 is an electrical schematic in block diagram of the servo system of the present invention.

The aforementioned Patent No. 2,692,377, discloses a position plotter which is used with a dead-reckoning tracer (DRT) which is housed in a glass covered rectangular box, not shown. A sheet of plotting paper is intended to be laid over the glass top so that ship movements indicated by lights from below can be plotted thereon. A light source driven by the conventional mechanism of the DRT projects a small spot of light up onto the plotting paper for indicating the location of own ship. The plotter, which is attached to the DRT, includes a light source for indicating on the plotting paper the location of other objects such as target ships. Data as to such locations are generally obtained in terms of bearing and range, that is, compass direction and distance as measured from own-ship. These bearing and range data are converted automatically into north and each components of distance, and the light which represents the target object is then automatically moved by motors 27 and 28 to the proper position relative to the light which represents the location of own ship, so that the target location may be marked by the plotting attendant. To this end potentiometers 31 and 32 are provided. Each of these consists of a wire wound bar extending along one full dimension of the plotting table. The potentiometer 31 has a contact 33 which moves in accordance with the east-west motions of own ship and a contact 34 which moves in accordance with east-west motions of the target object. When own ship and target have the same east-west coordinate their respective electric contacts pick up the same voltage from the potentiometer 31. Thus the voltage that appears between these two sets of contacts is a measure of the east-west component of the distance from own ship as indicated by its light and the target as indicated by its light. In similar manner, contacts 35 and 36 on potentiometer 32 are moved in accordance with the north-south motions of own-ship and target respectively so that the separation between their indicating lights is measured by the voltage between these contacts.

As shown in Fig. 1, A. C. power is applied at terminals 43 and 44. This energizes a calibrated variac 45 which is located at the DRT table, which in turn energizes a second calibrated variac 46 located at the transmitter station and actuated by the radar range crank 47. Energized from this variac 46 is a tapped auto-transformer 48, the output connections of which are connected to the rotor winding 49 of a resolver which is rotated by the radar bearing crank 51. The resolver also has a stator with quadrature windings 52 and 53 which deliver north-south and east-west voltage components respectively.

A transformer 54 has its primary supplied from the same power input terminals 43 and 44 through an adjustable resistor 55. The output of transformer 54 energizes the two potentiometers 31 and 32.

The difference voltages between the windings 52 and 53 and the potentiometers 31 and 32 are applied through the harmonic filters and rate filters to the voltage amplifiers and servo amplifiers indicated partly in block diagram form. The outputs of the servo amplifiers are applied respectively to the field windings of the servomotors to drive the indicating light in the proper direction to indicate the target position.

Variac 46 is the range transmitting potentiometer. For example, the source of range and bearing information may be a radar unit, in which case, potentiometer 46 is mechanically coupled to the range control crank 47 of the radar so that when the radar operator sets his range-dial he automatically sets the range indication for the servo circuits.

Coil 49 is rotated by the bearing control of the radar control station so that the outputs of coils 52 and 53 bear relations to the voltage of coil 49 which are sine and cosine functions of the bearing angle of the target, that is the number of degrees to the right of north at which the target lies. Accordingly, the output voltages from coils 52 and 53 are proportional to the north-south and east-west distance components from the radar observer (located at own ship) to the target. Accordingly, if the voltages appearing across the pairs of contacts at potentiometers 31 and 32 are made equal to the output voltages of coils 53 and 52, the target lamp will be at the proper position to indicate the location of the target on the plotting paper (as aforedescribed).

The task of the servo system is to move the target lamp to the positions that make these voltages equal. For example, the output of the two contacts at the E-W potentiometer 31 is connected in series with that from the coil 53 so that they subtract, and the servo system drives the E-W motor 27 to bring this difference-voltage to zero.

The voltage impressed across the potentiometers 31 and 32 is kept at maximum so that the degree of accuracy as measured in inches on the plot will be kept at maximum. To increase the scale of the plot, that is to increase the number of inches on the map that represent a thousand yards of distance, the voltage is raised at variac 45, which is located at the DRT table.

The resolver has a construction like that of a polyphase induction motor which places an air gap in its magnetic circuit. On effect of this air gap is to increase the magnetizing current and thereby present an appreciable inductance to the input circuit so that the output voltage (from coils 52 and 53) leads that applied to primary coil 49. The high accuracy and sensitivity required of the present system makes it necessary that the voltages from each potentiometer 31 and 32 be in phase with that from the coil 53 or 52 with which it is connected because two out-of-phase voltages can never exactly cancel each other. Accordingly, transformer 54 is constructed with an air gap in its magnetic circuit, and rheostat 55 permits the series resistance to be adjusted to make the ratio of resistance to inductance the same for the primary circuits of the resolver and transformer 54. In practice, this adjustment is made by observing the relative phases of the output voltage. Since this construction gives the input circuits of the resolver and transformer 54 essentially the same character, the system stays in balance in spite of changes in the frequency of the supply voltage.

The servo system of the present invention operates at extremely high speed and so is capable of moving the target light quickly from one position of the plot to another. This high speed coupled with the high accuracy of its operation is an extremely valuable property. So before explaining the servo system itself it is convenient to describe first, some other features of the invention which permit this high speed to be taken full advantage of. First it should be borne in mind that a single radar control unit can be operated rapidly enough to track several targets by taking repeated bearings and ranges on them. The operator rotates his equipment to the bearing at which he gets a good target indication and then turns his range knob to line up certain indicators for getting an accurate range measurement. As was described in connection with Fig. 1, these two operations bring the voltages at coils 52 and 53 to values which indicate the north-south and east-west components of the target's distance from own ship. Furthermore since the servo operates at high speed the target light arrives at the correct position in a fraction of a second. When the radar operator has these settings he signals the plotting attendant to mark. He does so by pressing a button which turns on a signal light at the DRT table and also disables the servomotors 27 and 28. Thereupon the target light is left stationary to "remember" the target position so that the radar operator is released to search out the next target without waiting for the plotting attendant to complete his task. After he has marked the location of the target, the plotting attendant presses a release button which immediately restores the servo operation and, because the servo operates at high speed, the target light jumps to the new position. This operation of the servo is as fast as a person's reaction time so that the radar operator, if he has been waiting for the plotting attendant to release the equipment, can press the "mark" switch again as soon as he sees the "release" signal.

The servo amplifiers may be seen in Fig. 1. There the top row of apparatus constitutes the servo amplifier for motor 28 which drives the target light in the north-south direction. Since both amplifiers are identical it suffices to describe this amplifier only. It is to be expected that a system of transformers such as that shown in Fig. 1 would have an output voltage containing a number of harmonics of the fundamental 60 cycle voltage. These are troublesome and the input circuit is provided with a harmonic filter network for eliminating the third, fifth and seventh harmonics. Higher order harmonics appear with such small amplitudes as to be unobjectionable. Because of the symmetrical character of the system even harmonics will not appear. The harmonic filter network is constructed with high Q, and also with careful adjustment, to provide substantially complete elimination of a narrow band of frequencies centered at 180, 300 and 420 respectively.

Filter 74 is of a somewhat different construction and contributes to the high-speed operation of the system. It passes a substantial part of the 60 cycle input signal and increases its transmission for both higher and lower frequencies. This frequency characteristic of the filter makes the output of the amplifier vary as the algebraic sum of two voltages, one proportional to the instantaneous magnitude of the 60 cycle input and the other proportional to the rate at which that magnitude is changing. In terms of operation of the servo motor 28, the amplifier output has two components. One is proportional to the number of volts, as measured on potentiometer 32, by which the target light fails to lie in its correct position. The other component is proportional to the speed at which the target light approaches the correct position. This speed component prevents over-shoot. For example when the plotting attendant re-ables the circuits to the servo motors, the target light may be a considerable distance from its proper position. Motor 28 will receive a component of current proportional to this distance, (limited of course by the maximum current available from the control tubes) and will move at high speed toward the correct position. If no account were taken of this speed, the inertia of the system would make it run beyond the proper point because when the driving voltage went to zero the motor 28 would still be spinning. However, in the present system an opposing voltage proportional to speed is introduced, which provides a drive in the reverse direction at the time that the target light is approaching its correct position so as to slow down the motor. When the system is properly adjusted, overshoot is held to approximately $\frac{1}{32}$ of an inch. This slight over-shoot makes the target light settle down with a slight shake which tends to equalize any unavoidable backlash that is present in the system.

Viewed differently, the error voltage from potentiometer 32 and winding 52, if amplified linearly to control the servo motor 28, would provide a driving force proportional to the displacement. Such a driving force by itself would produce sustained oscillations. That is, the target light would oscillate about the target position instead of coming to rest there. It is known that an additional force proportional to velocity in a sufficiently high ratio and opposing the motion (usually called a damping force) will prevent such oscillations. It is also known that if the error voltage is A. C., a voltage proportional to the velocity (that is to the rate of change of the error voltage) will consist of a certain pattern of side-band frequencies, and that substantially the desired pattern can be obtained by passing the error signal itself through a suitable filter, such as filter 74. Thus, when the targets light is moving the magnitude of the 60 cycle error voltage is changing and the envelope of this changing 60 cycle voltage follows the position-function of the targets light. Whatever the pattern or function of this envelope may be, it can be expressed as a sum of sine and cosine terms in a Fourier series. Consider one such term:

$$E_m \cos 2\pi mt$$

where $E_m$ is the amplitude of the component
$m$ is the frequency of the "modulation" component
$t$ is time Its rate of change is then $$-E_m 2\pi m \sin 2\pi mt$$

so that the required 60 cycle voltage having an amplitude proportional to this component of the rate of change of the error voltage (or of the velocity of light 17) is $$-E_m 2\pi m (\sin 2\pi mt) \cos 2\pi 60 t$$

which reduces to $$E_m \pi [m \sin 2\pi(60+m)\, t - m \sin 2\pi(60-m)t]$$

This is the desired "rate" voltage. Notice that the $(60+m)$ and $(60-m)$ are side bands frequencies.

The actual error voltage appearing at terminals 18 and 20 because of this envelope component of frequency $m$ is:

$$E_m (\cos 2\pi mt) \cos 2\pi 60 t$$

which reduces to $$\frac{E_m}{2}\Big[\cos 2\pi(60+m)t + \cos 2\pi(60-m)t\Big]$$

Figure 2:
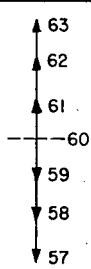
Figs. 2 and 3 are voltage vector diagrams for explaining the operation of the system.
Figure 3:
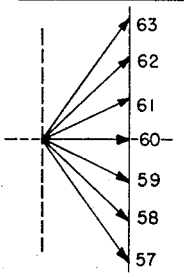

The ideal filter for converting this actual error voltage to the required "rate" voltage then would pass each side band frequency with an amplitude proportional to its deviation $m$ with a 90° phase advance for the upper side band and 90° phase lag for the lower band as indicated in the diagram of Fig. 2. In addition the 60 cycle error voltage and its side bands (all frequencies) must be passed without phase displacement. Accordingly the ideal filter for developing the total voltage for controlling the servo motor must have added to the frequency characteristic of Fig. 2, an inphase vector that is the same at all frequencies to provide a characteristic like that of Fig. 3. The length of the inphase component compared to the quadrature components as shown here is of no significance because the actual ratio is determined in part by the mechanical inertia of the system and the driving force of the servo motors.

Figure 4:
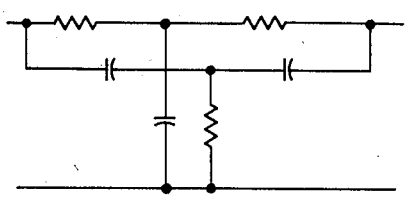
Fig. 4 is a diagram of a prior art device and Figs. 5 and 6 are voltage vector diagrams for it.
Figure 5:
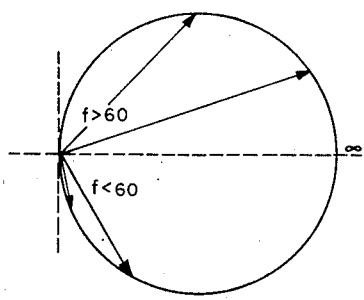
Figure 6:
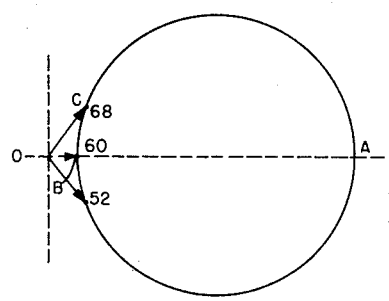

It has been known heretofore to employ for this purpose a filter such as that shown in Fig. 4, which passed the side bands as shown in Fig. 5, together with another path for transmitting the 60 cycle component, so that the whole filter had a transmission characteristic such as that of Fig. 6. This arrangement provided a sufficiently good approximation to the ideal transmission characteristic shown in Fig. 3, but it had the marked disadvantage that the magnitude of the output voltage was too low. Thus in Fig. 6, the maximum magnitude OA of the transmission vector (which occurs for frequencies of zero and infinity) is equal to unity. The magnitude OB at 60 cycles, while under the control of the designer has to be matched, in part, to the magnitude of the quadrature component (vertical distance such as BC in Fig. 6) for the side band frequencies. In the present system frequencies from 52 to 68 cycles are of primary interest, and with a filter characteristic like Fig. 6 the maximum magnitude of the quadrature component of the transmission characteristic (distance BC) in this frequency range is only about 0.13.

In accordance with the present invention, I employ a filter in which the frequencies are spread out more near the frequency of minimum transmission (near the point B in Fig. 6). Furthermore, I employ a filter in which the spread can be controlled and I adjust it to the most desirable degree of spread, as for example to get the maximum quadrature voltage at the extreme frequency of interest.

Figure 7:
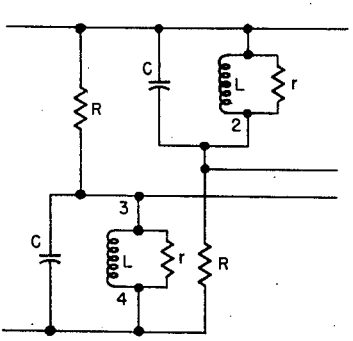
Fig. 7 is a circuit diagram of the filter of the present system and Fig. 8 is a voltage vector diagram showing its operation.

As shown in Fig. 7, the lattice-type filter 74 of Fig. 1 constitutes a symmetrical bridge circuit. Here the inductance L and equivalent shunt-resistance $r$ of the inductor are indicated separately. For use with the present system it is constructed and adjusted to have the characteristic shown in Fig. 8. Condenser C must have such a value that the coil L$r$ and condenser C resonate at 60 cycles. For this discussion, define Q as the ratio of the shunt resistance $r$ of this coil to its reactance at 60 cycles. Let $n = \pm m/60$ (for example, $n = 0.13$ when $m = 8$). Then to a first approximation the quadrature component of the transmission of the filter has the magnitude $nQ$. It is thus seen that in this system of my invention the frequency spread near the carrier frequency depends on the Q of the inductor and can be adjusted to an optimum condition. I select the Q of the coil (at the 60 cycle carrier frequency) to give me as large a quadrature component as possible without departing too much from the ideal of Fig. 3.

Figure 8:
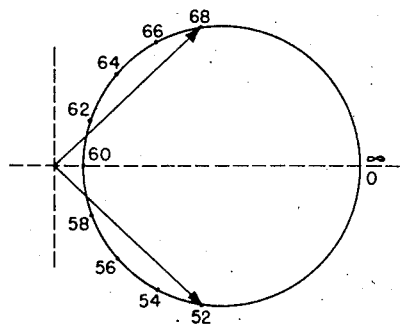

In the present system the factor $n$ has an expected maximum value of 0.13, and I employ a coil having a Q of approximately 6 at 60 cycles. This gives a maximum quadrature component as shown in Fig. 8. The construction of Fig. 8 is based on an assumed transmission of .1 at 60 cycles. The correct value depends on the inertia of the system and is best adjusted by trial by varying the values of the resistors R in Fig. 7.

In the filter of Fig. 7, one-half of the bridge circuit, that is, one series combination of resistance arm and parallel resonant arm, is vectorially represented by the upper half of Fig. 8. In other words, a factor of 2 must be introduced into each quadrature component indicated in the construction of Fig. 8. It is the quadrature component, the vertical component of the vectors of Fig. 8, which provide the desired rate component.

Since the construction of Fig. 8 is based upon assumed total transmission of 0.1 at 60 cycles, it is evident that the maximum quadrature component, the radius of the circle, is 0.45. The latter value, of course, may approach 0.5 as the 60 cycle transmission decreases from 0.1. Thus $$nQ\left(=\frac{mQ}{60}\right)$$

the quadrature component at maximum deviation should have a maximum value of 0.45 which defines Q as less than $$\tfrac{1}{2}\frac{60}{m}$$

However, the total quadrature component of the filter is due to the addition of the quadrature components from each of the two parallel resonant circuits whereby $nQ$ at maximum deviation must be less than unity or not greater than 0.9 (with 60 cycle transmission of 0.1) to define a Q which is less than 60/m. Thus it will be seen that with the filter of Fig. 7, operating as indicated in Fig. 8, it is possible to obtain the quadrature component which is greatly in excess of the quadrature component (0.13 of total transmission) which can optimumly be obtained from the filter of Fig. 4. From inspection of Fig. 8, it is readily apparent that the criteria which govern this filter are mainly two in number. The first criterion, for obtaining transmission at 60 cycles, is that the capacitance and inductance are so chosen that they are resonant at the 60 cycle carrier frequency and, at such resonant frequency, have a resistance which is greater than the resistance of the resistive arm. The second criterion, which governs the obtaining of optimum or maximum quadrature component possible with this filter, comprises the choice of the Q of the coil. It may readily be seen from inspection of Fig. 8 that nQ, the maximum quadrature component, will be 0.45 for a single ended circuit (a single pair of resistance and parallel resonant arms) and will be equal to 0.9 for the complete double ended bridge shown. Thus, in either case, nQ, which is equal to plus or minus mQ/60, must be less than 1, whereby it obviously follows that Q must be less than 60/m. As long as the Q of the coil is kept below the ratio of the carrier frequency to the maximum deviation frequency, wide variations of Q are possible which will still provide a substantially increased frequency spread within the expected deviation. The above explanation of the criteria which determines 60 cycle transmission and optimum Q are features which are inherent in the described apparatus and the vectorial representation of the operation thereof.

The output of filter 74 is applied to a pair of push-pull amplifiers 75 and 76. The input signal at times may be beyond the capacity of these amplifiers, and under these conditions the output will be essentially a square wave. This output is applied to a second pair of push-pull stages 77 and 78. Connected in parallel with the grid circuits of the stages 77 and 78 is a pair of diodes 81 and 82 so balanced that when the input voltage is high enough to make the grid of the tube 77 or 78 swing positive to draw current, the opposite swing of the voltage will cause the diodes to draw an equal but opposite current and thereby prevent a charge from accumulating on the coupling condensers 83 and 84. This arrangement prevents the amplifiers 77 and 78 from imposing phase distortion on the signal under overload. This voltage amplifier circuit which suppresses phase distortion is disclosed and claimed in the co-pending divisional application of George A. Brettell, Jr., Serial No. 407,620, filed January 29, 1954. The output of amplifiers 77 and 78 is applied through coupling transformer 85 to a pair of thyratrons 86 and 87. The plate voltage for these thyratrons is 60 cycles A. C. since these thyratrons are connected directly in series with the 60 cycle servo motor 28. An A. C. bias voltage is supplied from a bias phase adjuster network which includes the resistor 88 and condenser 89 such that the bias voltage leads the cathode voltage of the tube by a phase angle of approximately 60 degrees. Since phase distortion has been kept out of the amplifier, the signal which transformer 85 adds to this bias has substantially either the same phase as the anode voltage or the opposite phase (except for the phase advance caused by the resolver). Thus one tube increases its current and the other decreases it to control the motor.

Each of the servo motors 27 and 28 has two opposing field windings. Thus each of the thyratrons 86 and 87 controls the current to one of the windings of the N-S servo motor 28. Normally the two windings receive equal currents so that the motor does not turn. Any signal applied to the thyratrons through transformer 85 disturbs this balance and drives the motor in the proper direction.

Obviously many modifications and variations of the present invention are possible in the light of the above teachings. It is therefore to be understood that within the scope of the appended claims the invention may be practiced otherwise than as specifically described.

What is claimed is:

1. A servo system comprising a motor having an output shaft and means for energizing said motor to drive said shaft to a selected angular position with a minimum of oscillation, said means comprising means for producing an error signal having a predetermined frequency and an amplitude directly related to the difference between said selected position and the instantaneous angular position of said shaft, and means responsive to said error signal for feeding to said motor a control signal having a first component of magnitude proportional to the instantaneous magnitude of said error signal in phase with said error signal and a second component having a magnitude proportional to the rate of change of said error signal and in phase therewith, said last mentioned means comprising a filter circuit including a resistive arm and a reactive arm in series therewith, said reactive arm being resonant at said predetermined frequency and having a resistance at resonance which is substantially different from the resistance of said resistance arm, said control signal being the signal appearing at the junction of said arms.

2. The system of claim 1 wherein said reactive arm includes a capacitor in shunt with an inductance, said inductance having a ratio of shunt resistance to reactance at said predetermined frequency less than one-half of the ratio of said predetermined frequency to the frequency of a predetermined maximum rate of change of amplitude of said error signal, whereby said second component approaches maximum magnitude at said predetermined maximum rate of change.

3. A servo system comprising a motor, means for generating an amplitude modulated carrier signal having a modulation envelope of predetermined maximum frequency, and control means responsive to said generating means for supplying to said motor a control signal which varies as the algebraic sum of a first voltage component proportional to the rate of change of said carrier signal envelope and a second voltage component proportional to the instantaneous amplitude of said carrier signal, said control means comprising a symmetrical lattice section having a pair of reactance arms and a pair of resistance arms, each of said reactance arms including a parallel combination of inductance and capacitance resonant at the frequency of said carrier signal, each of said inductances having a ratio of shunt resistance to reactance at said carrier frequency which is less than the ratio of said carrier frequency to the maximum frequency of the said modulation envelope.

4. The system of claim 3 wherein the resistance of each of said reactive arms at said carrier frequency is substantially different from the resistance of each of said resistance arms.

5. A circuit for adding a damping component to a fixed frequency carrier signal having an amplitude modulation envelope of predetermined maximum frequency, said damping component being representative of the rate of change of said envelope, said circuit comprising a bridge including two parallel connected pairs of series connected impedance arms, the connections between said pairs providing input terminals and the connection between the arms of each pair providing output terminals, at least one of said pairs including a resistance arm and a reactance arm, said reactance arm comprising a parallel connected inductance and capacitance resonant at said fixed frequency and having a resistance at resonance which is substantially different than the resistance of said resistance arm, said inductance having a ratio of shunt resistance to reactance at said fixed frequency which is less than the ratio of said fixed frequency to said predetermined maximum frequency.

6. The circuit of claim 5 wherein the other of said pairs includes a second resistance arm and a second reactance arm having substantially the same characteristics as said first mentioned resistance and reactance arms, said second resistance and reactance arms being connected to input terminals respectively opposite to the input terminals to which said first mentioned resistance and reactance arms are connected.

References Cited in the file of this patent

UNITED STATES PATENTS

| | | |
|---|---|---|
| 2,395,515 | Stoller | Feb. 26, 1946 |
| 2,472,167 | Matson | June 7, 1949 |
| 2,506,798 | Lilja | May 9, 1905 |